Jan. 23, 1934.    R. B. FRENCH    1,944,552
MINE CAR CHECK LOCK AND COLLECTOR
Filed June 1, 1933    3 Sheets-Sheet 1
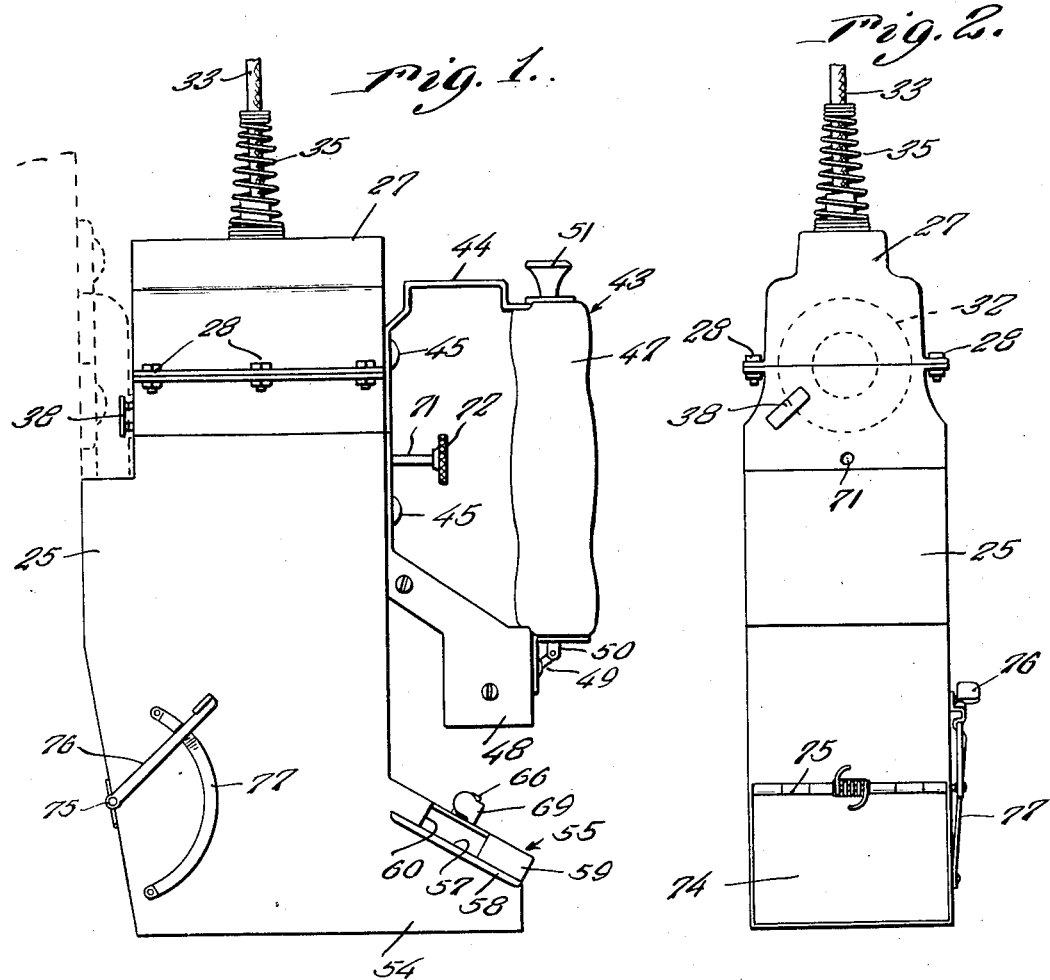
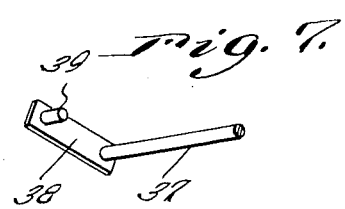
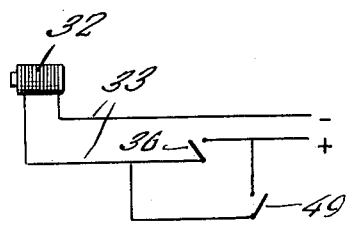
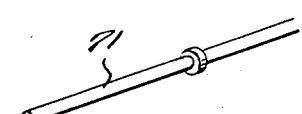
Inventor
R. B. French
By Clarence A. O'Brien
Attorney Jan. 23, 1934.  R. B. FRENCH  1,944,552
MINE CAR CHECK LOCK AND COLLECTOR
Filed June 1, 1933  3 Sheets-Sheet 2
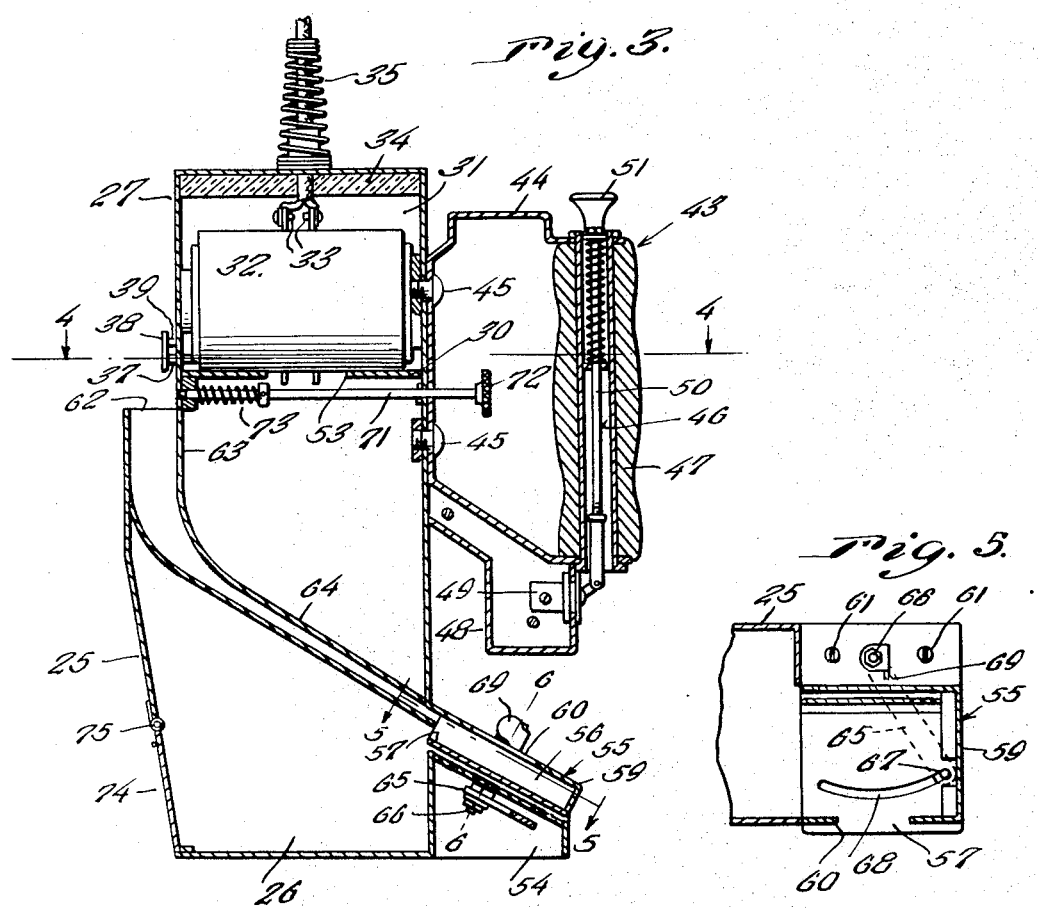
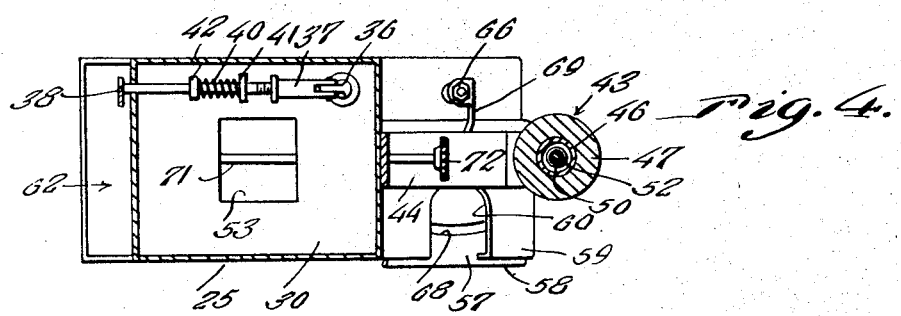
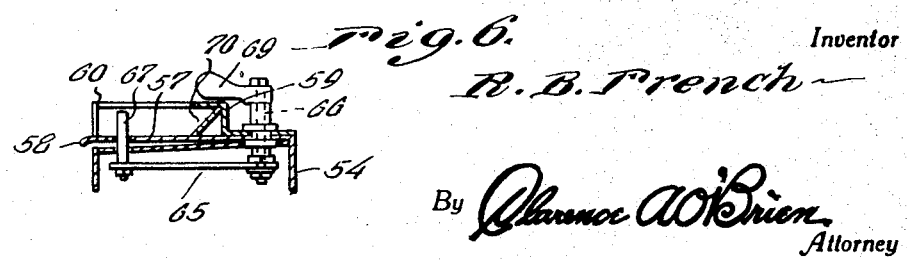

Jan. 23, 1934.     R. B. FRENCH     1,944,552
MINE CAR CHECK LOCK AND COLLECTOR
Filed June 1, 1933     3 Sheets-Sheet 3
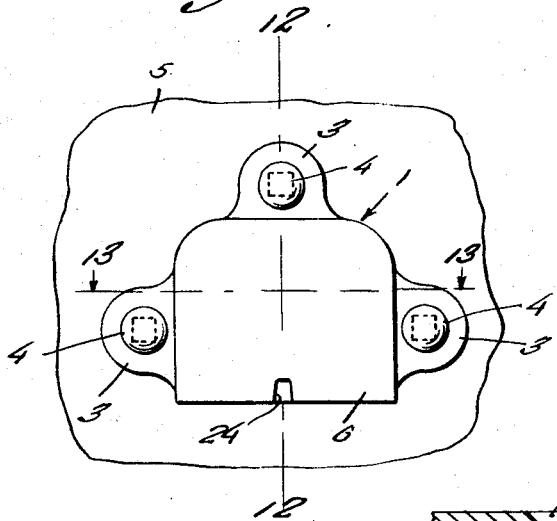
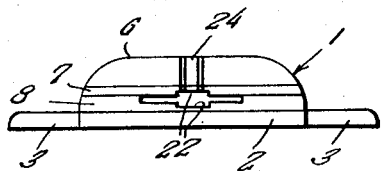
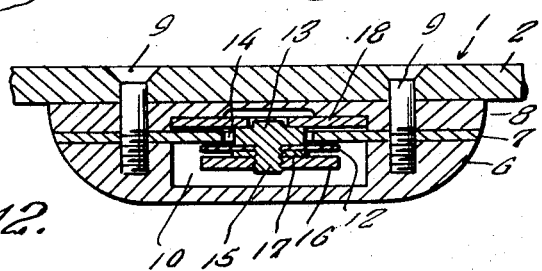
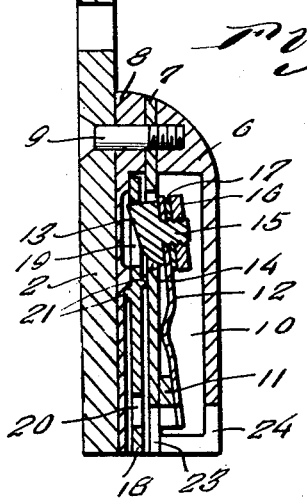
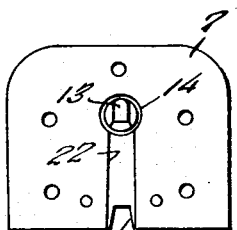
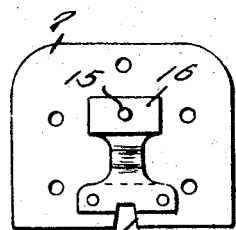
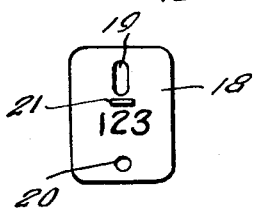
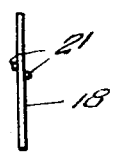
Inventor
R. B. French
By Clarence A. O'Brien
Attorney Patented Jan. 23, 1934

1,944,552

UNITED STATES PATENT OFFICE 1,944,552

MINE CAR CHECK LOCKS AND COLLECTORS

Roy B. French, Superior, W. Va.

Application June 1, 1933. Serial No. 673,916

2 Claims. (Cl. 232—1)

The present invention relates to new and useful improvements in mine car check locks and collectors and has for its primary object to provide, in a manner as hereinafter set forth, a lock and collector of this character embodying a novel construction, combination and arrangement through the medium of which mistakes or the perpetration of fraud and the consequent confusion and dissatisfaction will be prevented.

Other objects of the invention are to provide a mine car check lock and collector of the aforementioned character which will be simple in construction, strong, durable, highly efficient and reliable in use, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of the collector, showing the same operatively engaged with the check lock, the latter being shown in broken lines.

Figure 2 is a view in front elevation of the collector.

Figure 3 is a view in vertical section through the collector.

Figure 4 is a horizontal sectional view, taken substantially on the line 4—4 of Figure 3.

Figure 5 is a sectional view through the observation compartment of the collector, taken substantially on the line 5—5 of Figure 3.

Figure 6 is a sectional view through the observation compartment of the collector, taken substantially on the line 6—6 of Figure 3.

Figure 7 is a detail view in perspective of a part of one of the collector switches.

Figure 8 is a detail view in perspective of a portion of the auxiliary check removing plunger.

Figure 9 is a diagrammatic view of the wiring circuit of the collector.

Figure 10 is a view in front elevation of the lock.

Figure 11 is a view in bottom plan of the lock.

Figure 12 is a vertical sectional view through the lock, taken substantially on the line 12—12 of Figure 10.

Figure 13 is a view in horizontal section, taken substantially on the line 13—13 of Figure 10.

Figure 14 is a detail view in rear elevation of an inner portion of the lock.

Figure 15 is a detail view in front elevation of that portion of the lock shown in Figure 14.

Figure 16 is a detail view in front elevation of a check.

Figure 17 is a detail view in side elevation of a check.

Referring now to the drawings in detail, and to the Figures 10 to 17, inclusive, in particular, it will be seen that the lock which has been illustrated comprises a casing which is designated generally by the reference numeral 1, said casing comprising a back plate 2 having apertured ears 3 projecting therefrom which accommodate securing elements 4 for mounting the lock on a mine car, a portion of which is indicated at 5. The casing 1 further comprises a front plate 6 and intermediate plates 7 and 8 which are secured on the back plate 2 by screws 9. The plates 6 and 8 of the casing 1 are formed to provide a chamber 10 which is open at the bottom of the casing, said chamber 10 being divided into compartments by the plate 7.

On the lower portion of the plate 7 a transverse boss 11 is provided which, if desired, may be integral with said plate 7. Mounted on the boss 11 for operation in the outer compartment of the chamber 10 is a resilient latch 12 having mounted on its upper end portion a head 13 which is operable in an opening 14 provided therefor in the plate 7. The head 13 is beveled, as illustrated to advantage in Figure 12 of the drawings, and includes an integral threaded shank 15 which extends through the resilient latch 12. Threadedly mounted on the shank 15 is an armature 16. The reference numeral 17 designates a spacing washer which is mounted between the armature 16 and the latch 12. It may be well to here mention that the casing 1 is of non-magnetic metal.

The inner compartment of the chamber 10 slidably receives a numbered check which is designated by the reference numeral 18, said check being in the form of a substantially flat metallic plate having a slot 19 in its upper portion for the reception of the head 13 and an opening 20 in its lower portion, the purpose of which will be presently set forth. Projecting from opposite sides of the check 18 are guards 21 which prevent the insertion of an instrument by unauthorized persons for disengaging the head 13, thereby releasing the check from the lock. The opposed faces of the partition plate 7 and the plate 8 are provided with channels which accommodate the guards 21. These channels are indicated at 22. When the check 18 is in position in the casing 1, the opening 20 is alined with notches 23 and 24 in the partition plate 7 and the front plate 6 of the casing.

The beveled head 13 normally projects through the opening 14 of the partition plate 7 into the inner compartment of the chamber 10. As best seen in Figure 13 of the drawings, the head 13 is formed to provide side shoulders which bear against the front side of the partition plate 7.

The check 18 is slid upwardly in the casing 1 between the partition plate 7 and the plate 8, the beveled head 13 being forced forwardly and then snapping into the slot 19. It will thus be seen that the check 18 is positively secured in the casing 1.

The collector which releases and receives the check from the lock comprises a housing of nonmagnetic metal which is designated generally by the reference numeral 25, the lower portion of said housing being formed to provide a check receiving compartment 26. The housing 25 includes a removable top 27 which is secured in position, as at 28. Below the removable top 27 is a horizontal partition 30 providing an upper compartment 31 in the housing 25.

Mounted in the compartment 31 is an electromagnet 32 which is connected with a suitable source of current supply by conductors 33. The conductor wires 33 pass through insulating material 34 in the upper portion of the removable top 27. The reference numeral 35 designates a coiled protector which is provided on the removable top 27 for the conductor wires.

Interposed in the electric circuit of the magnet 32 is an automatic switch 36 which is mounted on the partition 30. As illustrated to advantage in Figure 4 of the drawings, the switch 36 includes a lever to which one end of a plunger 37 is pivotally connected. The plunger 37 extends slidably through the front wall of the housing 25 adjacent the magnet 32 and has fixed on its outer end a head in the form of an elongated, flat plate 38. On one end portion, the head 38 has mounted thereon a guide 39 (see Figure 7) which is slidable in an opening provided therefor in the front wall of the housing 25. A coil spring 40 encircles the plunger 37 and has one end engaged with an apertured ear 41 which rises from the partition 30 and in which said plunger is operable and its other end engaged with a collar 42 which is provided therefor on the plunger. As will be apparent, the spring 40 yieldingly urges the plunger 37 in a direction to open the switch 36.

Mounted on the upper portion of the rear wall of the housing 25 is a handle which is designated by the reference numeral 43. The handle 43 includes a substantially U-shaped metallic bar 44 which is secured to the housing 25 by nut-equipped bolts 45. As seen in Figure 3 of the drawings, one of the bolts 45 constitutes means for anchoring the magnet 32 in position. Extending vertically between the end portions of the substantially U-shaped bar 44 is a tube 46 upon which a sleeve 47 of suitable material, preferably wood, is mounted.

The lower arm of the substantially U-shaped bar 44 constitutes the top of a switch casing 48 which is mounted beneath the handle 43. The reference numeral 49 designates a manually operable auxiliary or emergency switch which is mounted in the casing 48. The switch 49 includes a lever to which is pivotally connected a plunger 50 which is operable in the tube 46 of the handle 43 and which has mounted on its upper end a thumb or finger receiving head 51. A spring 52 is provided for yieldingly urging the plunger 50 in a direction to open the switch 49. The switch 49 is interposed in the electric circuit to the magnet 32, as seen in Figure 9 of the drawings. The partition 30 is provided with an opening 53 for the passage of the conductor wires from the switches 36 and 49 to the magnet 32.

Projecting rearwardly from the lower portion of the housing 25 is an inclined platform 54 upon which a check receiving and observing casing which is designated generally by the reference numeral 55 is mounted. Casing 55 is formed to provide a chamber 56 and includes a resilient plate 57 which is secured, at one side, on the platform 54, the other side of said plate being free and normally spaced from the platform, as best seen in Figure 6 of the drawings. The free side of the plate 57 has formed thereon a downturned lip 58. The casing 55 further includes a cover 59 having an observation opening 60 therein. The opening 60 extends to and communicates with that side of the cover 59 which is adjacent the free side of the plate 57. The free side of the plate 57 is normally engaged with the corresponding portion of the cover 59, as seen in Figure 6 of the drawings. Screws 61 constitute common means for securing the cover 59 and the resilient plate 57 at one side to the inclined top of the platform 54.

The upper portion of the front wall of the housing 25 is offset in a manner to provide a horizontal opening 62 with which the enlarged inlet end 63 of an inclined chute 64 which is mounted in said housing 25 communicates. The chute 64 is arranged to discharge the checks into the chamber 56 of the casing 55. As illustrated to advantage in Figure 3 of the drawings, the discharge end of the check chute 64 is spaced above the plate 57 of the casing 55, thus permitting the checks to be ejected from the observation chamber 56 into the chamber 26 of the housing 25.

To accomplish the transfer of the checks from the observation chamber 56 into the chamber 26, a swinging arm 65 is fixed on a rotary shaft 66 beneath the inclined top of the platform 54. Mounted on the free end of the arm 65 is a finger 67 which travels in arcuate slots 68 which are provided therefor in the inclined top of the platform 54 and the resilient plate 58. The reference numeral 69 designates an operating lever which is fixed on the shaft 66. An inclined guide 70 is provided in the compartment 56 for directing the checks toward the free side of the resilient plate 57. The arm 65 swings in an inclined plane and, therefore, returns to retracted or inoperative position by gravity.

Slidably mounted in the housing 25 below the horizontal partition 13 is an emergency or auxiliary check remover in the form of a rod which is designated by the reference numeral 71 having a head 72 on its rear end. The rod 71 is adapted to be projected forwardly against the tension of a coil spring 73 for engagement in the opening 20 of the check 18, the notches 23 and 24 of the lock casing 1 accommodating said rod. As will be apparent, spring 73 constitutes means for yieldingly retaining the rod 71 in retracted position.

In use, the enlarged inlet end 63 of the chute 64 is positioned beneath the lock to receive the check therefrom and the head 38 of the plunger 37 is engaged with the lock casing 1. The collector is then pressed toward the lock for closing the switch 36 against the tension of the spring 40 to energize the magnet 32. Energization of the magnet 32 with the collector in this position attracts the armature 16 in the lock for retracting the resilient latch 12, thereby releasing the check 18 and permitting said check to drop by gravity into the chute 64. The chute 64 conveys the check into the compartment 56 of the casing 55 where the numeral on the check may be observed through the opening 60. Then, if desired, the check may be removed from the collector by engaging the finger or thumb therewith through the opening 60 and pressing downwardly in a manner to flex the resilient plate 57 to permit the passage of the check between the free side of said resilient plate and the cover 59. Should it be desired to deposit the checks in the chamber 26, the lever 69 is actuated to move the finger 57 upwardly for discharging the checks from the chamber 56 into said chamber 26 beneath the lower end of the chute 64. A spring closed door 74 is hingedly mounted, as at 75, on the front wall of the housing 25 to permit removal of the checks from the chamber 26. The door 74 is actuated through the medium of a lever 76 which travels over a quadrant 77 which is mounted on one side of the housing 25. Should the switch 36 fail to function, the circuit to the magnet 32 may be closed by manually depressing the plunger 50 against the tension of the coil spring 52 for closing the auxiliary switch 49.

Should the check 18 become fouled in the casing 1 of the lock and thereby fail to drop by gravity when released, the rod 71 is manually projected into said casing through the notches 23 and 24 and engaged in the opening 20. Then, the check may be drawn downwardly out of the casing 1 by simply moving the collector downwardly, as will be apparent.

It is believed that the many advantages of a mine car check lock and collector constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. A collector for releasing and receiving a mine car check from a check lock, said lock having a casing for the reception of the check and magnetic force responsive means for releasably securing the check in the casing, said collector including a housing having a chamber therein for the reception of the check, an electromagnet mounted in the housing for actuating the check securing means, and a control switch for the magnet operatively engageable with the casing for actuation to closed position thereby.

2. A collector for releasing and receiving a mine car check from a check lock, said lock including magnetic force responsive means for releasably securing the check, said collector including an electromagnet for actuating the check securing means, switch means for controlling the electromagnet, and manually operable means engageable with the check for withdrawing said check from the lock.

ROY B. FRENCH.